United States Patent Office 3,347,954
Patented Oct. 17, 1967

3,347,954
POLYMERIZATION OF VINYL COMPOUNDS AND UNSATURATED POLYESTERS USING BARBITURIC ACIDS AND ALPHA ACYL NITRILES AS CATALYSTS
Hellmut Bredereck, Stuttgart, Baldur Föhlisch, Stuttgart-Weilimdorf, and Raimund Franz, Neuhausen, Filder, Germany, assignors to Deutsche Gold- und Silber-Scheideanstalt vormals Roessler and W. C. Heraeus G.m.b.H., Frankfurt am Main, Germany, and Hanau am Main, Germany
No Drawing. Filed Apr. 27, 1965, Ser. No. 451,350
Claims priority, application Germany, May 2, 1964, D 44,322
8 Claims. (Cl. 260—864)

The present invention relates to an improved process for polymerizing vinyl compounds and unsaturated polyesters.

It is known that the polymerization of vinyl compounds, such as the esters of acrylic acid and methacrylic acid and unsaturated polyesters can be carried out in the presence of air, oxygen and/or peroxidic compounds, if desired, with use of elevated temperatures. It furthermore is known that accelerators may be employed in conjunction with catalysts. For example, tertiary amines, compounds containing a labile (ionogenically bound) halogen atom, such as, the salts of hydrohalic acids, hydrochlorides of tertiary amines, chlorides of onium compounds, for example, quaternary ammonium compounds, ester chlorides and the like can be used as accelerators. In addition, organic sulfur compounds, such as, α-amino sulfones α-oxy sulfones, mercaptans, sulfinic acids and their salts have also been used for this purpose.

It furthermore is known that phenyl acetaldehyde and/or its derivatives which are substituted on the benzene nucleus can be used as catalysts for curing unsaturated polyester resin masses. Also, α-monosubstituted phenyl acetaldehyde either alone or in combination with other catalysts, as well as α-imino butyric acid ester have also been used for the same purpose.

Technologically interesting results can be achieved with these polymerization initiating systems. However, subsequent discoloration which occurs in some instances may be of disadvantage.

According to the invention it was found that polymerizable vinyl compounds, preferably, esters of acrylic or especially methacrylic acid either singly or in mixtures, preferably, in the presence of their polymers, and unsaturate polyester, preferably, in the presence of partially polymerized monomers can be polymerized to especially stable products in the presence of oxygen or air and/or, preferably, in the presence of organic peroxide, if desired, also in the presence of accelerators, if such polymerization is carried out in the presence of at least one compound of the formula $$A-CH-B$$
$$\phantom{A-C}\underset{R^1}{|}$$

in which: A and B can be the same or different and signify the groups $$-C=S$$
$$\phantom{-C}\underset{R^4}{|}$$

or, preferably,

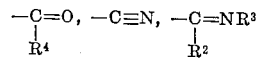

or their tautomeric forms.

$R^1$, $R^2$ and $R^3$ can be the same or different and signify hydrogen or alkyl, aryl, hydroxy, cycloalkyl, aralkyl, alkylaryl, alkoxy, aryloxy, acyloxy, amino, N-substituted amino, alkyl mercapto or aryl mercapto radicals which may, if desired, be substituted. $R^4$ has the same significance as $R^1$, $R^2$ and $R^3$ except for the exclusion of hydrogen. In addition, two or more of the radicals $R^1$, $R^2$, $R^3$ and $R^4$ may be closed to a ring or to rings, which, if desired, can be substituted and, if desired, can also contain heteroatoms, especially nitrogen atoms and carbonyl groups, however, with the exclusion of β-iminobutyric acid esters and compounds of the formula

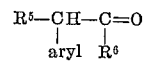

in which $R^5$ is a $-C\equiv N$ or a $COOR^7$ group and $R^6$ is hydrogen,

alkyl or aryl group ($R=-OH$, $-OCH_3$, $-OC_2H_5$, $-OC_3H_7$, $-NH \cdot C_6H_5$; $R^7$=alkyl group containing 1–3 C-atoms).

Preferably, such compounds are employed in which the radicals $R^1$, $R^2$, $R^3$ and $R^4$ have the following significance:

$R^1$ and $R^4$ are hydrogen or alkyl, aryl, cycloalkyl, aralkyl, alkaryl, alkoxy, aryloxy, acyloxy, amino, N-substituted amino, alkyl mercapto or aryl mercapto radicals which, if desired, may be substituted.

$R^2$ is hydrogen or alkyl, aryl, cycloalkyl, aralkyl or alkaryl which, if desired, may be substituted.

$R^3$ is hydroxy, alkoxy, aryloxy, amino, N-mono- and di-substituted amino.

The grouping

in the above defined compounds which is connected on both sides directly with a carbon atom carrying a bi- or trivalent oxygen, sulfur or nitrogen function provides the polymerization initiating action.

The process according to the invention can be used for emulsion, solution or bulk polymerizations, preferably, for the latter. The advantage of the process is the stability of the products produced against water and subsequent discoloration.

Examples of the classes of compounds suitable for the purposes of the invention are open chained and cyclic β-ketonitriles, open chained and cyclic β-ketoesters, open chained and cyclic 1,3-diketones, α-acyl nitrile, α,α-dinitriles and especially representatives of the barbituric acid series. Of such compounds which come in question, the representatives of the barbituric acid series are preferred most of all and the α-acyl nitriles next.

Among the compounds concerned usually those are preferred in which $R^1$ is not hydrogen but rather one of the other groups indicated. The 5-alkyl substituted barbituric acids are especially advantageous because of their good solubility in water and/or organic solvents. In some instances the solubility of the compounds concerned can be improved by the addition of, for example, dioxane or dimethyl formamide. A great range of variation is possible in the use of the catalysts with good solubility.

Examples of compounds according to the invention in which the radicals $R^1$, $R^2$, $R^3$ and $R^4$ are closed to a ring or to rings, for instance, are dimedone, methylene-bis-dimedone, α-cyano-cyclohexanone, cyclohexyl-spiro-cyclohexandione-(3,5).

Among the substituents of the aliphatic type indicated in connection with the general formula those of 1 to 7 carbon atoms are preferred and phenyl is the preferred representative of the acyl groups. It, of course, is not desirable to select substituents which can have an inhibiting action on the polymerization.

The catalyst compounds according to the invention can be used in almost any desired quantity. The upper limit primarily is determined by the economy and costs involved. For example, quantities of 10% can be used without trouble but in general quantities between about 0.05 to about 6% by weight and preferably between about 0.5 and 3% by weight with reference to the monomer are used.

In order to shorten the time required for the polymerization it is of advantage to employ other known accelerators in addition to the compounds according to the invention. Among such additional accelerators, compounds which contain ionogenically bound halogen atoms (which easily form halogen and especially chlorine ions) are especially suited. In addition, the so-called pseudo halogenides, to which the thiocyanates, cyanides and azides belong, can also be used expediently for the same purpose. Furthermore, the co-use of heavy metal compounds, preferably, copper compounds is especially advantageous. A combination of the halogenides with heavy metal compounds is particularly advantageous.

Other known accelerators which may be present in the mixture to be polymerized are the organic sulfur compounds, such as, α-amino- and α-oxysulfones and mercaptans as well as alcohols, especially, the monohydric primary and secondary alcohols.

The additional accelerators are employed in their customary known quantities.

Fundamentally the process according to the invention can be carried out with good success in the presence of air or oxygen, that is, in the presence of molecular oxygen. In many instances, however, especially when uniform conditions are concerned, it is preferable to carry out the polymerization in the presence of peroxides known for these purposes. The diacyl and hydroperoxides especially come into question, but preferably alkyl acyl peroxides, such as, tertiary-butyl perbenzoate are used.

Examples of monomers or co-monomers which can be polymerized according to the invention are methyl methacrylate, acrylonitrile, styrene, vinyl acetate and the like. Powder/liquid systems can also be used in a known manner as starting materials. Advantageously starting compositions are employed which contain a polymer of the monomer either completely or partially dissolved in the monomer. The polymeric materials can, if desired, also contain polymerizable unsaturated bonds as is, for example, the case with unsaturated polyesters. The term unsaturated polyesters is employed herein to designate polyesters derived from polybasic carboxylic acids and polyhydric alcohols, at least one of such acidic or alcoholic components being ethylenically unsaturated.

Preferably the compositions to be polymerized are syrupy compositions which contain the polymer in the form of a prepolymer obtained by partial polymerization of the monomer.

The polymerization according to the invention can be carried out in the presence of fillers, dyes, pigments, reenforcing agents, as well as stabilizers, such as, hydroquinone, which are known per se.

The process according to the invention can, for example, be used in the production and use of flat or corrugated plates which may be reenforced, if desired, as well as for casting, filling, patching, coating and adhesive compositions.

The process according to the invention can also be used with special success in the fields of human and veterinary medicine, as well as, in dental technology, for example, as molding material, modelling material and filling material in the production of prosthetics, embedments, fixations, as well as, for the production of equipment and apparatus for orthopedics and surgery.

The following examples will serve to illustrate the invention with reference to a number of embodiments thereof.

*Example 1*

2 ml. of pure destabilized methyl methacrylate were mixed with 20 mg. of each of the catalysts given in the following Table 1, 12 γ copper acetylacetonate in 0.1 ml. of methanol and 2 mg. of dibutylamine hydrochloride, also in 0.1 ml. of methanol. The polymerization was carried out at 25° C., 35° C. or, respectively, 60° C. After 30 minutes the polymer was precipitated with methanol/water (3:1), filtered, dried and weighed. The catalysts used and the quantity of polymer produced are given in Table 1.

TABLE 1

| Catalyst | Polymer yield at— | | |
|---|---|---|---|
| | 25° C., percent | 35° C., percent | 60° C., percent |
| α-Benzoyl-acetonitrile | 2.8 | | |
| α-Benzoyl-propionitrile | 13.2 | | |
| α-Benzoyl-butyronitrile | 10.4 | | |
| α-Benzoyl-valeronitrile | 10.9 | | |
| α-Acetyl-propionitrile | 14.6 | | |
| α-Propionyl-propionitrile | 11.7 | | |
| α-Cyano-cyclohexanone | 12.6 | | |
| α-Cyano-cyclopentanone | 15.8 | | |
| Dimedone | | 3.2 | |
| Cyclohexyl-spiro-cyclohexandione-(3,5) | | 4.4 | |
| 2-methyldimedone | 16.7 | | |
| Barbituric acid | | | 13.6 |
| 1-methyl-barbituric acid | | | 16.2 |
| 1,3-dimethyl-barbituric acid | | 5.6 | |
| 1,3-diphenyl-barbituric acid | | | 15.7 |
| 5-isopropyl-barbituric acid | 14.5 | | |
| 5-cyclohexyl barbituric acid | 11.4 | | |
| 1,5-dimethyl-barbituric acid | 22.6 | | |
| 1,3,5-trimethyl-barbituric acid | 27.0 | | |
| 1,3-dimethyl-5-ethyl-barbituric acid | 26.6 | | |
| 1,3-dimethyl-5-phenyl-barbituric acid | 10.4 | | |
| 1,3-dimethyl-5-isopropyl-barbituric acid | 15.5 | | |
| 1,3-dimethyl-5-sec.butyl-barbituric acid | 15.3 | | |
| 1,3-dimethyl-5-n.butyl-barbituric acid | 24.7 | | |
| 1,3-dimethyl-5-cyclopentyl-barbituric acid | 21.2 | | |
| 1,3-dimethyl-5-isobutyl-barbituric acid | 27.5 | | |
| 5-carbethoxy-cyclopentanone-(1) | 7.0 | | |
| α-Benzoyl-iso-valeronitrile | 7.4 | | |
| α-Cyano-acetic acid ethyl ester | | | 6 |
| α-Cyano-propionic acid ethyl ester | | | 3 |
| α-Cyano-caproic acid ethyl ester | | | 1.5 |
| Cyano-acetamide | | | 5 |
| N,N-dimethyl-cayano-acetamide | | | 3 |
| Malodinitrile | 7.0 | | |
| Butyl-malodinitrile | | | 9 |
| 3-methyl-pentane dione-(2,4) | | | 11.5 |
| 3-butyl-pentane dione-(2,4) | | | 9.88 |
| 2-acetyl-cyclohexanone | | | 8 |
| 1-cyclohexyl-spiro-4-methyl-cyclo-hexandione-(3,5) | 17.3 | | |

*Example 2*

A solution was prepared from 52 ml. of destabilized methyl methacrylate, 1.5 mg. of hydroquinone, 4 mg. of copper acetylacetonate and 1 ml. of methanol. A small quantity of dibutylamine hydrochloride was added and the resulting solution which was saturated therewith filtered.

1.8 ml. of this solution were stirred together with 3 g. of polymeric methyl methacrylate (beads) and 1% (30 mg.) of the catalyst and the time required until the maximum temperature was reached (min./t.) determined.

The results are given in following Table 2.

TABLE 2

| Catalyst | Starting Temperature, 25° C. |
|---|---|
| α-Benzoyl-propionitrile | 10′/85° |
| α-Benzoyl-butyronitrile | 11′/78° |
| α-Benzoyl-valeronitrile | 10′/83° |
| α-Acetyl-propionitrile | 10′/82° |
| α-Propionyl-propionitrile | 10′/85° |
| α-Cyano-cyclohexanone | 7′/92° |
| 2-cyano-cyclopentanone | 7′/90° |
| 1,5-dimethyl-barbituric acid | 6′/90° |
| 1,3,5-trimethyl-barbituric acid | 6′/90° |
| 1,3-dimethyl-5-isopropyl-barbituric acid | 8.5′/92° |
| 1,3-dimethyl-5-isobutyl-barbituric acid | 6.5′/90° |
| 1,3-dimethyl-5-phenyl-barbituric acid | 8.5′/92° |

Example 3

The procedure of Example 1 was repeated except that the methyl methacrylate was replaced by acrylonitrile. After a polymerization period of 30 minutes at 25° C. using 1,3,5-trimethyl-barbituric acid as catalyst, 26.2% of the polymer were obtained.

Example 4

The procedure of Example 1 was repeated at a temperature of 25° C. using 1.88, 18 and 54 mg. of 1,3,5-trimethyl barbituric acid as the catalyst. The yields of the polymer, respectively, were 11.5%, 27.0% and 36.2%.

Example 5

The procedure of Example 1 was repeated at a temperature of 25° C. except that a pseudo halogenide was used instead of the hydrochloride.

The results are given in the following Table 3.

TABLE 3

| Catalyst | Pseudo Halogenide | Polymer Yield, Percent |
|---|---|---|
| 1,3,5-trimethyl-barbituric acid | SCN- | 15.5 |
| α-Benzoyl-propionitrile | CN- | 11.4 |
| 1,3,5-trimethyl-barbituric acid | CN- | 17.9 |

SCN-=NH$_4$SCN; CN-=KCN.

Example 6

The procedure of Example 1 was repeated using 1,3,5-trimethyl-barbituric acid and α-benzoyl-propionitrile as the catalyst and 1% of a peroxide in addition. The polymerization was carried out at 25° C. The peroxide employed and the yield of polymer obtained are given in the following Table 4.

TABLE 4

| Catalyst | Peroxide | Polymer Yield, Percent |
|---|---|---|
| 1,3,5-trimethyl-barbituric acid | None | 27.0 |
| Do | Perhydrol (30% Vol. percent H$_2$O$_2$) | 32.3 |
| Do | t-Butyl-hydroperoxide | 35.3 |
| Do | p,p'-dichlorodibenzoyl-peroxide | 27.0 |
| α-Benzoyl-propionitrile | None | 13.2 |
| Do | Perhydrol | 12.6 |
| Do | t-Butyl-hydroperoxide | 14.6 |

Example 7

The procedure of Example 1 was repeated except that a starting mixture of methyl methacrylate and acrylonitrile in a volumetric ratio of 2:1 was used instead of methyl methacrylate. It was polymerized in the presence of 1% of 1,3,5-trimethyl barbituric acid at 25° C. for 30 minutes. The polymer yield was 35.4%.

Example 8

The procedure of Example 1 was repeated except that 1% of each of 1,3,5-trimethyl barbituric acid and of α-benzoyl-propionitrile was employed. The polymerization was for 30 minutes at 25° C. The polymer yield was 28%.

Example 9

The procedure of Example 2 was repeated but 1% of p,p'-dichlorobenzoyl peroxide was used in addition to 1,3,5-trimethyl-barbituric acid. With a starting temperature of 25° C. a maximum temperature of 98° C. was reached after 5 minutes.

Example 10

Example 9 was repeated except that a mixture of methyl methacrylate and acrylonitrile (2:1 by vol.) was used. A maximum temperature of 107° C. was reached after 6 minutes.

Example 11

Example 10 was repeated with the addition of 1% of p,p'-dichloro-dibenzoyl peroxide. A maximum temperature of 112.5° C. was reached after 4.5 minutes.

Example 12

0.5% by weight of 1,3,5-trimethyl barbituric acid were added to and well mixed with a commercial casting resin Palatal P 7 (a 70% by weight solution of an unsaturated polyester of maleic acid, o-phthalic acid and propylene glycol-1,2 in a molar ratio of 1:1:2 (acid number 40) in styrene and containing 0.01% hydroquinone). The mixture gelled after 2 hours at 22° C. After standing overnight the mixture hardened further to a shape stable clear colorless solid product.

Example 13

The procedure of Example 12 was repeated except that in addition 0.5% of phenyl ethyl dibutyl amine hydrochloride and 10 p.p.m. of Cu$^{++}$ (as naphthenate) were incorporated in the mixture. The mixture gelled in 15 minutes and after standing overnight hardened to a shape stable clear colorless solid product.

Example 14

The procedure of Example 13 was repeated except that in addition 2% of a 50% lauroyl peroxide paste (in dioctyl adipate) were also incorporated in the mixture. The mixture gelled after 3 minutes and completely hardened after 5 minutes with strong evolution of heat.

Example 15

1.0% of 1,3,5-trimethyl barbituric acid, 0.2% of phenyl ether dibutyl amine hydrochloride and 10 p.p.m. of Cu$^{++}$ (as naphthenate) were added to 15 ml. of unstabilized methyl methacrylate and shaken therein for a short time to effect solution thereof. The progress of the polymerization was followed by measurement of the refractive index $n_D^{20}$. The results are given in the following Table 5.

Table 5

| Time in minutes after addition of all substances: | Refractive index $n_D^{20}$ |
|---|---|
| 0 | 1.415 |
| 25 | 1.425 |
| 33 | 1.428 |
| 54 | 1.432 |
| 105 | 1.436 |
| 135 | 1.439 |
| 175 | [1] 1.447 |
| 185 | Gelled |
| 190 | (2) |

[1] Highly viscous syrup.
[2] Hard, clear weakly yellowish color tone.

Example 16

The procedure of Example 15 was repeated except that 1.0% of pure lauroyl peroxide was also incorporated in the mixture.

Table 6

| Time in minutes after addition of all substances: | Refractive index $n_D^{20}$ |
|---|---|
| 20 | 1.4357 |
| 27 | [1] 1.4528 |
| 32 | Solid |

[1] High viscous syrup.

Example 17

The procedure of Example 16 was repeated except that for comparison the trimethyl barbituric acid was omitted. The mixture after addition of all substances was fundamentally yellow and exhibited no further change in viscosity after 3 days.

Example 18

The procedure of Example 16 was repeated except that the additions were of the following quantities:

0.5% of 1,3,5-trimethyl barbituric acid
0.1% of phenyl ethyl dibutyl amine hydrochloride
2.0 p.p.m. Cu++
0.5% of lauroyl peroxide The results are given in the following Table 7.

TABLE 7

| Time in minutes after addition of all substances | Refractive index, $n_D^{20}$ | Temperature in the mixture °C. |
|---|---|---|
| 2 |  | 30.0 |
| 5 |  | 33.0 |
| 10 |  | 32.5 |
| 36 |  | 29.0 |
| 52 | 1.4399 | 28.5 |
| 60 |  | 29.5 |
| 75 | 1.4462 | 31.5 |
| 80 |  | 34.0 |
| 85 | 1.4492 (highly viscous syrup) | 40.0 |
| 87 |  | 66.0 |
| 88 | Solid, clear practically colorless product | 80.0 |

We claim:
1. In a process for the polymerization of a polymerizable composition containing as essential polymerizable component at least one polymerizable compound selected from the group consisting of lower alkyl esters of acrylic and methacrylic acid, acrylonitrile, styrene and vinyl acetate and unsaturated polyesters obtained from polycarboxylic acids and polyhydric alcohols, at least one of the carboxylic acids and alcohol components being ethylenically unsaturated, in the presence of at least one oxidizing catalyst selected from the group consisting of molecular oxygen and organic peroxides, the step which comprises carrying out such polymerization with the polymerizable component in contact with an effective amount to catalyze such polymerization of at least one catalytic compound selected from the group consisting of (1) a barbituric acid compound selected from the group consisting of barbituric acid, 5 substituted, 1,5 substituted and 1,3,5 substituted barbituric acids in which the substituents are selected from the group consisting of alkyl, cycloalkyl and phenyl and (2) α acyl nitriles of the formula

$$R-CO-CH-CN$$
$$\phantom{R-CO-C}|$$
$$\phantom{R-CO-CH-C}R^1$$

wherein, taken singly, R is selected from the group consisting of alkyl, aryl, cycloalkyl, aralkyl and alkaryl and $R^1$ is selected from the group consisting of hydrogen and alkyl and R and $R^1$, taken together, are an alkylene chain of 3 to 4 carbon atoms and form a ring with the $$-CO-CH-CN$$
$$\phantom{-CO-C}|$$

2. The process of claim 1 in which said catalytic compound is employed in a quantity between 0.05 and about 6% by weight with reference to the polymerizable component.

3. The process of claim 1 in which said catalytic compound is employed in a quantity between 0.5 and about 3% by weight with reference to the polymerizable component.

4. The process of claim 3 in which said catalytic compound is a barbituric acid compound selected from the group consisting of barbituric acid, 5 substituted, 1,5 substituted and 1,3,5 substituted barbituric acids in which the substituents are selected from the group consisting of alkyl, cycloalkyl and phenyl.

5. The process of claim 4 in which said catalytic compound is a 1,3,5-triloweralkyl barbituric acid.

6. The process of claim 5 in which said catalytic compound is 1,3,5-trimethyl barbituric acid.

7. The process of claim 3 in which said catalytic compound is an α-acyl nitrile of the formula $$R-CO-CH_2-CN$$

wherein R is selected from the group consisting of lower alkyl and phenyl.

8. The process of claim 3 comprising in addition carrying out said polymerization in the presence of at least one polymerization accelerator selected from the group consisting of compounds containing ionogenically bound halogen, pseudo halogenides, heavy metal compounds, α amino sulfones, α oxy sulfones and mercaptans.

References Cited

UNITED STATES PATENTS

| | | | |
|---|---|---|---|
| 2,900,360 | 8/1959 | Schnitz | 260—866 |
| 3,001,967 | 9/1961 | Willersinn | 260—865 |
| 3,031,301 | 4/1962 | Agens | 260—864 |

MURRAY TILLMAN, *Primary Examiner.*

J. T. GOOLKASIAN, *Assistant Examiner.*